(12) United States Patent
Allison

(10) Patent No.: US 6,961,839 B2
(45) Date of Patent: Nov. 1, 2005

(54) GENERATION OF NATIVE CODE TO ENABLE PAGE TABLE ACCESS

(75) Inventor: David S. Allison, San Ramon, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 268 days.

(21) Appl. No.: 10/365,861

(22) Filed: Feb. 13, 2003

(65) Prior Publication Data

US 2004/0162960 A1   Aug. 19, 2004

(51) Int. Cl.$^7$ .............................................. G06F 12/00
(52) U.S. Cl. ..................................... 711/206; 711/209
(58) Field of Search ........................ 711/206–209, 203, 711/141, 152

(56) References Cited

U.S. PATENT DOCUMENTS

| | | | | |
|---|---|---|---|---|
| 5,696,927 A | * | 12/1997 | MacDonald et al. | 711/207 |
| 5,768,593 A | * | 6/1998 | Walters et al. | 717/141 |
| 5,996,055 A | * | 11/1999 | Woodman | 711/203 |
| 6,112,286 A | * | 8/2000 | Schimmel et al. | 711/208 |
| 6,125,430 A | * | 9/2000 | Noel et al. | 711/152 |
| 6,493,816 B1 | * | 12/2002 | Munroe et al. | 711/209 |

* cited by examiner

Primary Examiner—Nasser Moazzami
(74) Attorney, Agent, or Firm—Osha Liang LLP

(57) ABSTRACT

A system for generating native code of a software application includes a page table indexing a plurality of pages using a page pointer, wherein the page pointer includes an address of at least one of the plurality of pages, a memory cache including a page table cache and a page cache, and a statically-generated executable code to obtain data on at least one of the plurality of pages using the memory cache.

20 Claims, 7 Drawing Sheets

GENERATION OF NATIVE CODE TO ENABLE PAGE TABLE ACCESS

BACKGROUND OF INVENTION

Page tables and pages are often used in general purpose computers to facilitate accessing data in memory. FIG. 1 shows a flow diagram of accessing data in memory by mapping virtual pages to physical pages using a page table. Memory (20) is divided into physical pages representing physical addresses in memory, such as physical page 1 (22), physical page 2 (24), and physical page 3 (26). In order to enhance performance of a software application, virtual pages representing virtual memory are often used by the software application to supplement the physical memory. Thus, the number of virtual pages may be greater than the pages that represent physical memory. For example, virtual page 1 (28), virtual page 2 (30), virtual page 3 (32), virtual page 4 (34), and virtual page 5 (36) may be used by a process, even though the size of the virtual memory (represented by the virtual pages) is greater than the physical memory represented.

A page table (38) maps the virtual memory to the physical memory. For example, FIG. 1 shows virtual page 1 (28) and virtual page 2 (30) mapped onto physical page 1 (22), while virtual page 3 (22) and virtual page 4 (34) are mapped onto physical page 2 (24). Virtual page 5 (36) is mapped onto physical page 3 (26). A set of pages may be assigned to a particular software application, or to individual processes (or set of processes) executed by the software application. For example, process A of the software application may be assigned to virtual page 1 (28), and process B may be assigned to virtual page 2 (30). Thus, process A and process B share physical page 1 (22). Typically, as far as the software application is concerned, the mapping of pages through the page table is "transparent."

FIG. 2 shows a computer system for accessing data in memory. As shown in FIG. 2, a software application (50) interacts with an operating system (52), such as Solaris™ (a trademark of Sun Microsystems), a processor (54), an external cache (an "e-cache") (60), and the memory (20), to access a page N (62). The processor often includes such resources as an on-board cache (56), a set of registers (58).

When the software application (50) (or a process executed by the software application) requests a value of a variable stored on page N (62), the operating system (52) loads (i.e., uses a LOAD instruction) the address of the variable into a register of the set of registers (58). To accomplish the load of the value, the operating system (52) attempts to retrieve the value from the on-board cache (56). If unsuccessful, the operating system attempts to retrieve the value of the variable from the e-cache (60). If the value of the variable is still not found, the operating system (52) retrieves the value from the memory (20).

Once the value of the variable is found, the operating system (52), through a page table (not shown in FIG. 2), maps the address of the variable to a physical address in the memory (20) using the page table. Thus, the page N (62) may function as a virtual page for the software application (50), but the value of the variable is stored in a physical page in the memory (20). Page N (62), therefore, represents both a physical page and a virtual page.

Various caching schemes may be used in computer systems. For example, the e-cache (60) may be direct-mapped, where a particular address in the memory (20) is mapped to a particular cache line of a cache. For example, if the e-cache (60) is direct-mapped, the value of the variable from an address of the page N (62) may be stored in a particular cache line of the e-cache (60). Data stored in a particular page, e.g., page N (62) may be shared by two separate and distinct processes of a software application (50). For example, a software application with two different processes (e.g., a first process and a second process) maintain separate and distinct virtual pages, which are mapped to the same physical page, e.g., page N (62) In this situation, a potential corruption of data (as it relates to the second process) may result if the first process writes to page N (62).

To avoid possible corruption of data in page N (62), the operating system may use a "copy on write" memory management technique. When using copy on write, the operating system responds by copying page N to a new location (i.e., relocating the page) in the memory (20) after the first process writes to page N (62). The second process is still be mapped to the former location of page N. Other scenarios may also cause relocation of a page to a new location. For example, execution of a SET instruction for a SPARC™ processor, produced by Sun Microsystems, Inc., may cause relocation of a page.

Because the copy of page N (62) is stored in different areas of the memory (20) after such relocation, any particular data stored in the copy of page N (62), e.g., the value of the variable, may, be stored in two separate cache lines of the e-cache (60). In the case of direct-mapped e-cache (60), data from page N (60) that was previously stored in a particular line of the c-cache (60), e.g., line 100 of the e-cache (60), and was accessible by both processes from line 100, now is stored in two distinct, separate lines of the e-cache (60), e.g., line 100 and line 200 (the new line for the first process).

SUMMARY OF INVENTION

In general, in one aspect, the invention relates to a system for generating native code of a software application. The system comprises a page table indexing a plurality of pages using a page pointer, wherein the page pointer comprises an address of at least one of the plurality of pages, a memory cache comprising a page table cache and a page cache, and a statically-generated executable code to obtain data on at least one of the plurality of pages using the memory cache.

In general, in one aspect, the invention relates to a method for generating native code of a software application. The method comprises calculating an address of a page, setting a pointer to the address of the page, generating an instruction for the software application to obtain the address of the page using the pointer, and executing the instruction to obtain data from the page at the obtained address.

In general, in one aspect, the invention relates to a computer system for enhancing performance of a software application. The computer system comprises a processor, a memory, a storage device, and software instructions. The software instructions are stored in the memory for enabling the computer system to perform calculating an address of a page in the memory, setting a pointer to the address of the page, generating an instruction for the software application to obtain the address of the page using the pointer, and executing the instruction to obtain data from the page at the obtained address.

In general, in one aspect, the invention relates to an apparatus for enhancing performance of a software application. The apparatus comprises means for calculating an address of a page, means for setting a pointer to the address of the page, means for generating an instruction for the software application to obtain the address of the page using the pointer, and means for executing the instruction to obtain data from the page at the obtained address.

Other aspects and advantages of the invention will be apparent from the following description and the appended claims.

DETAILED DESCRIPTION

Figure 1:
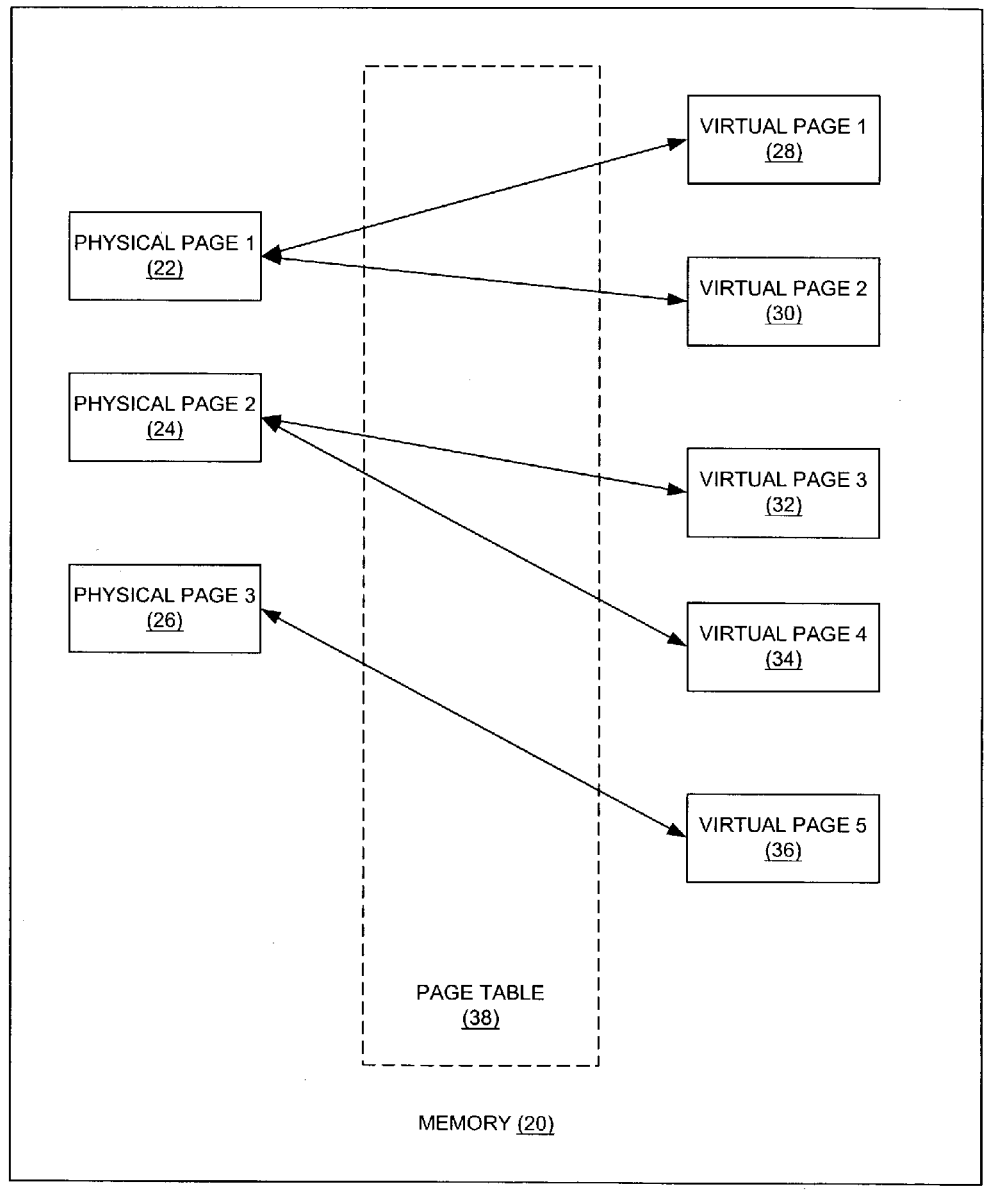
FIG. 1 shows a flow diagram of accessing data in memory using a page table.
Figure 2:
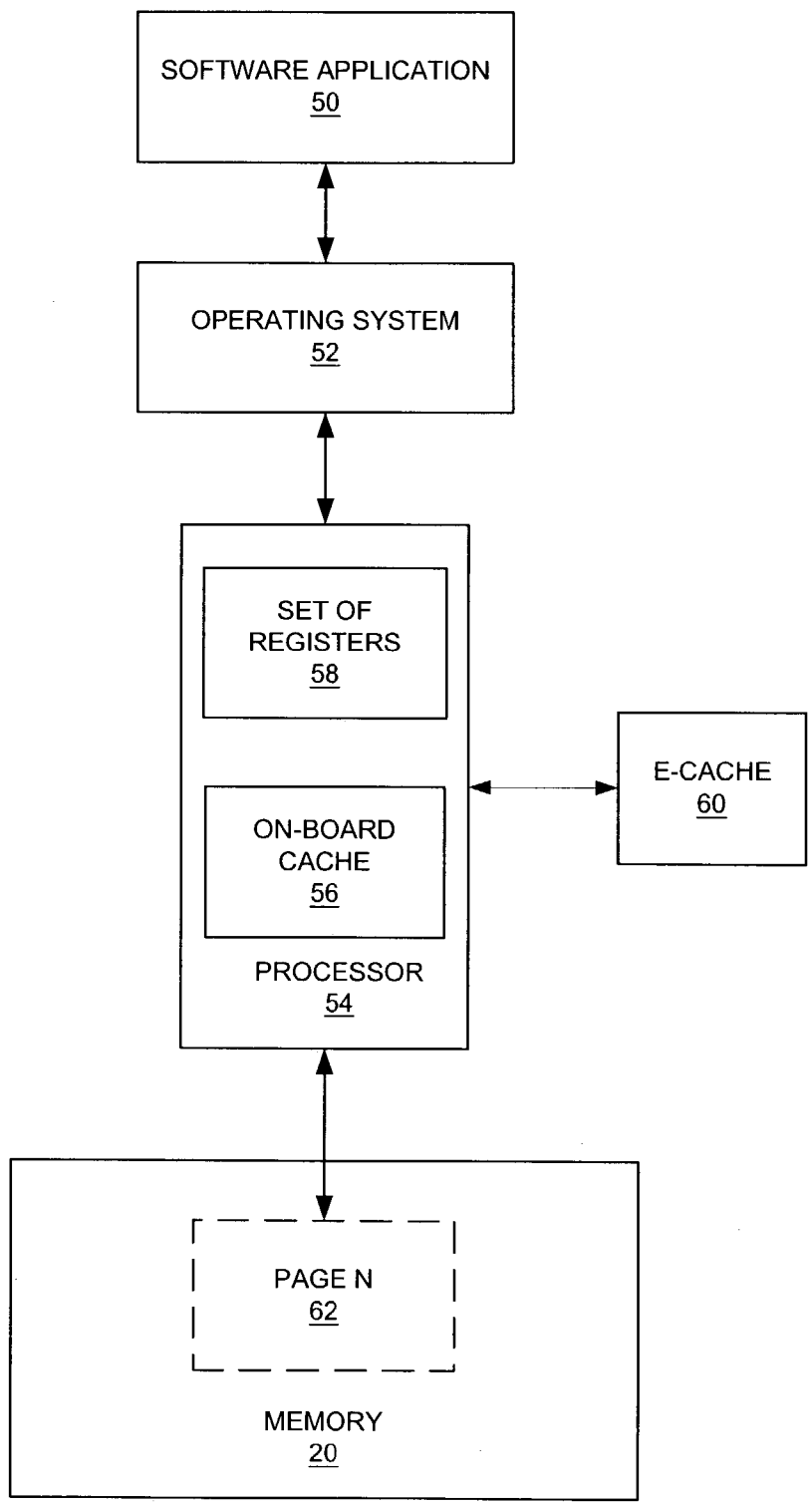
FIG. 2 shows a computer system for accessing data in memory.

Specific embodiments of the invention will now be described in detail with reference to the accompanying figures. Like elements in the various figures are denoted by like reference numerals for consistency.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In one aspect, the invention relates to enhancing performance of execution of statically-generated executable code executing on a computer system. In accordance with an embodiment of the invention, the executable code is generated statically as "native code" for a particular, targeted computer system. In accordance with an embodiment of the invention, the computer system targeted for execution of the statically-generated executable code may include specialized hardware using multiple processors executing in parallel executing a program, such as a cycle-based simulation of a logic design. Alternatively, the computer system may be a general purpose computer, such as a SPARC™ workstation produced by Sun Microsystems, Inc.

Figure 3:
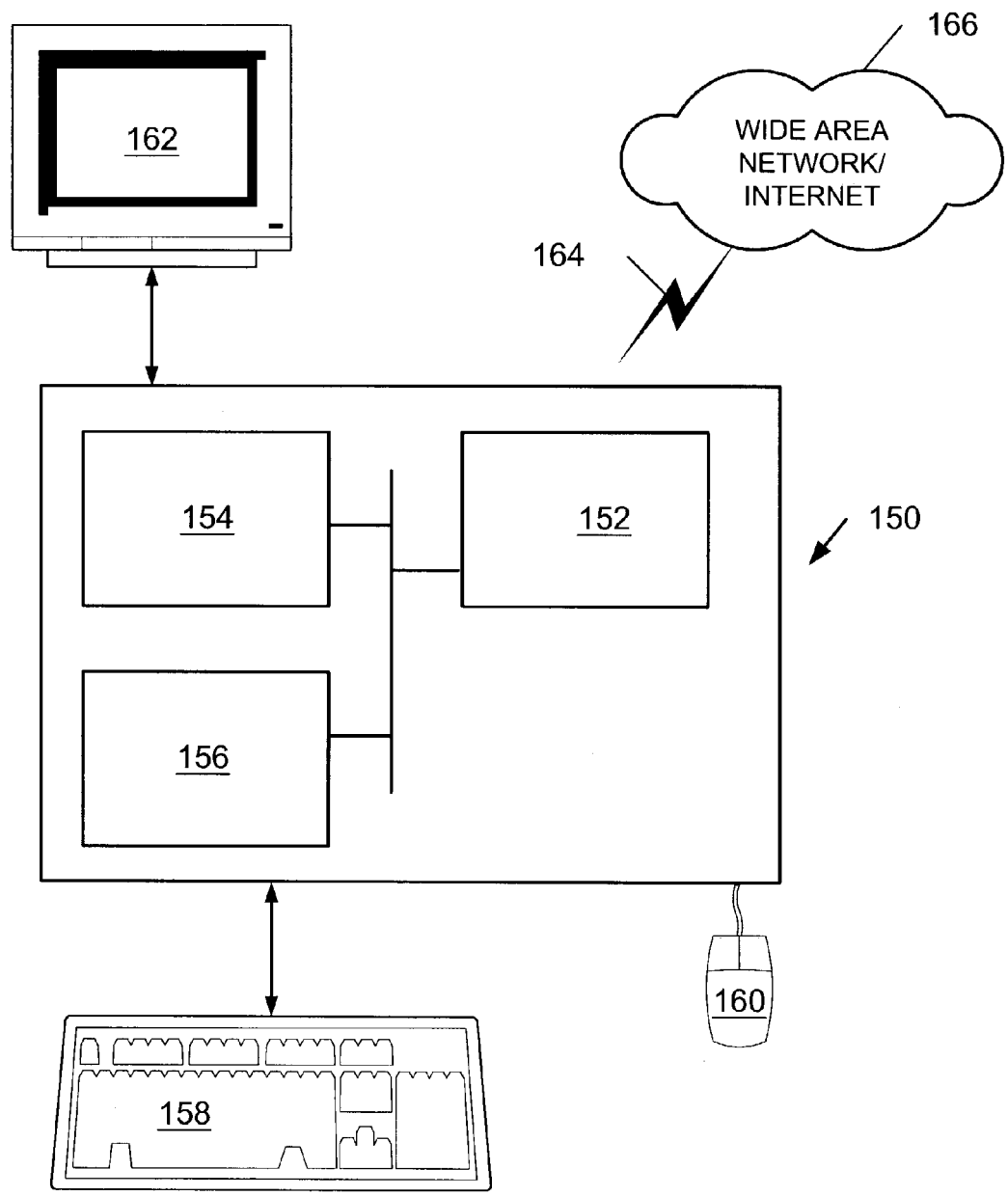
FIG. 3 shows a typical general purpose computer.

In one or more embodiments of the present invention, an exemplary computer system for executing the simulation is shown in FIG. 3. A typical general purpose computer (150) has a processor (152), associated memory (154), a storage device (156), and numerous other elements and functionalities typical to today's computers (not shown).

The computer (150) has associated therewith input means such as a keyboard (158) and a mouse (160), although these input means may take other forms. The computer (150) is also associated with an output device such as a display device (162), which may also take other forms. The computer (150) is connected via a connection means (164) to a Wide Area Network (WAN) (166), such as the Internet.

The computer system described above is for purposes of example only. Embodiments of the invention may be implemented in any type of computer system or processing environment.

In accordance with an embodiment of the invention, a compiler is used to generate the statically-generated executable code for execution on the computer system. The compiler may execute on a computer system, such as shown in FIG. 3. The compiler and specific code generation processes include a scheme for routing and scheduling of messages and placement of compiled execution processor code so that there is some optimization in the choice of which of the execution processors to use for certain tasks. One skilled in the art can appreciate that compilation of a software application may be targeted to a specific execution environment and/or platform, e.g., specialized parallel computer system hardware or an appropriate conventional computer, such as a SPARC™ workstation produced by Sun Microsystems, Inc.

Figure 4:
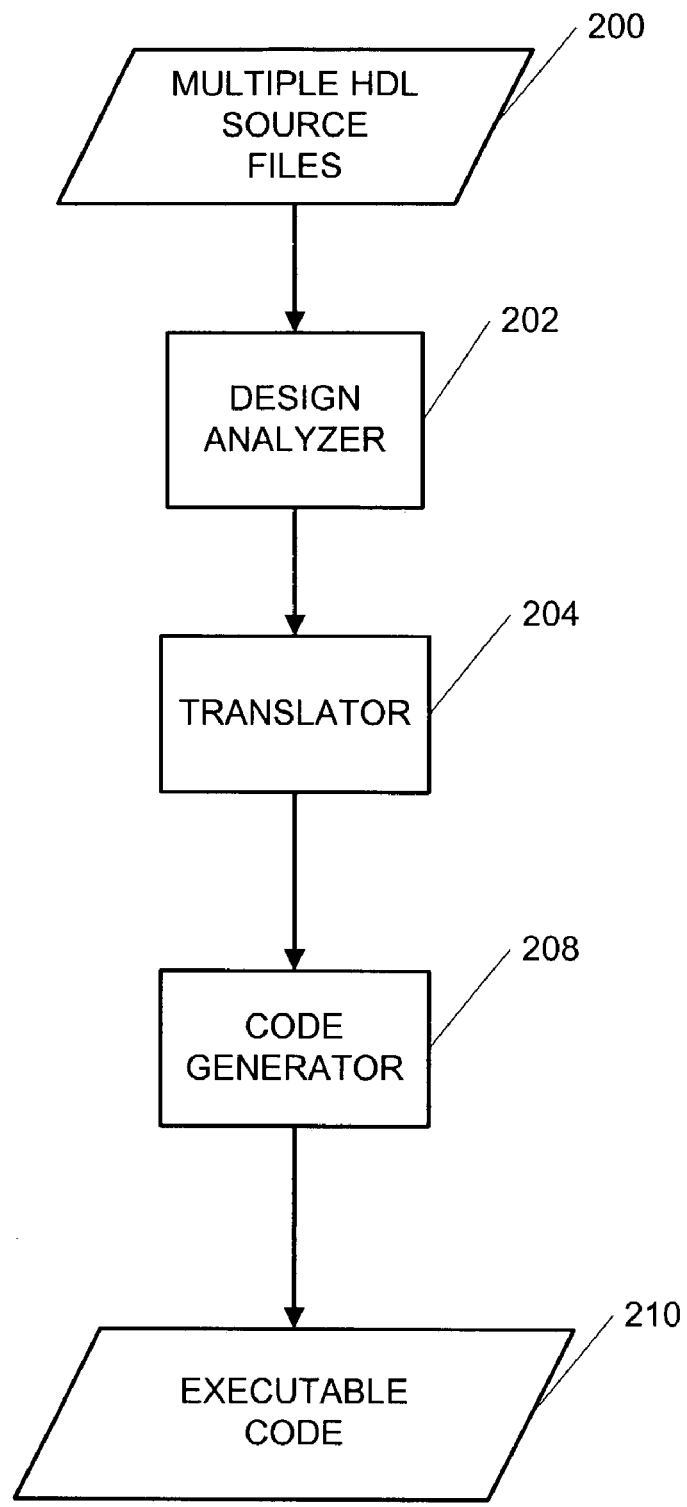
FIG. 4 shows a flow diagram of a compiler in accordance with an embodiment of the invention.

FIG. 4 shows a flow diagram of a compiler in accordance with one or more embodiments of the present invention. The compiler includes a design analyzer (202) process, a translator (204) process, and a code generator (208) process. The design analyzer (202) receives input in the form of HDL source files (200) (e.g., Verilog modules) and generates a high-level representation of a simulation design, ordered for single-pass execution in a cycle-based simulation on a computer system. This high-level representation may include, for example, a component reference data structure (i.e., an object-oriented data structure) containing shared information for component types; a component instance data structure containing information for specific component instances as well as flattened connectivity information components (instances) collected by type; a list of simulation variables; and a sorted component list in which the sort order corresponds to the execution order for single-pass, cycle-based execution.

The translator (204) receives the high level representation and translates the operations into a sequential representation (or intermediate form (IF)) that describes the simulation operations. The sequential representation is transformed by the code generation process (208) to emit executable code (210) for a particular computer system. In the case of a cycle-based system, the code may be statically-generated (as opposed to dynamically-generated).

Figure 5:
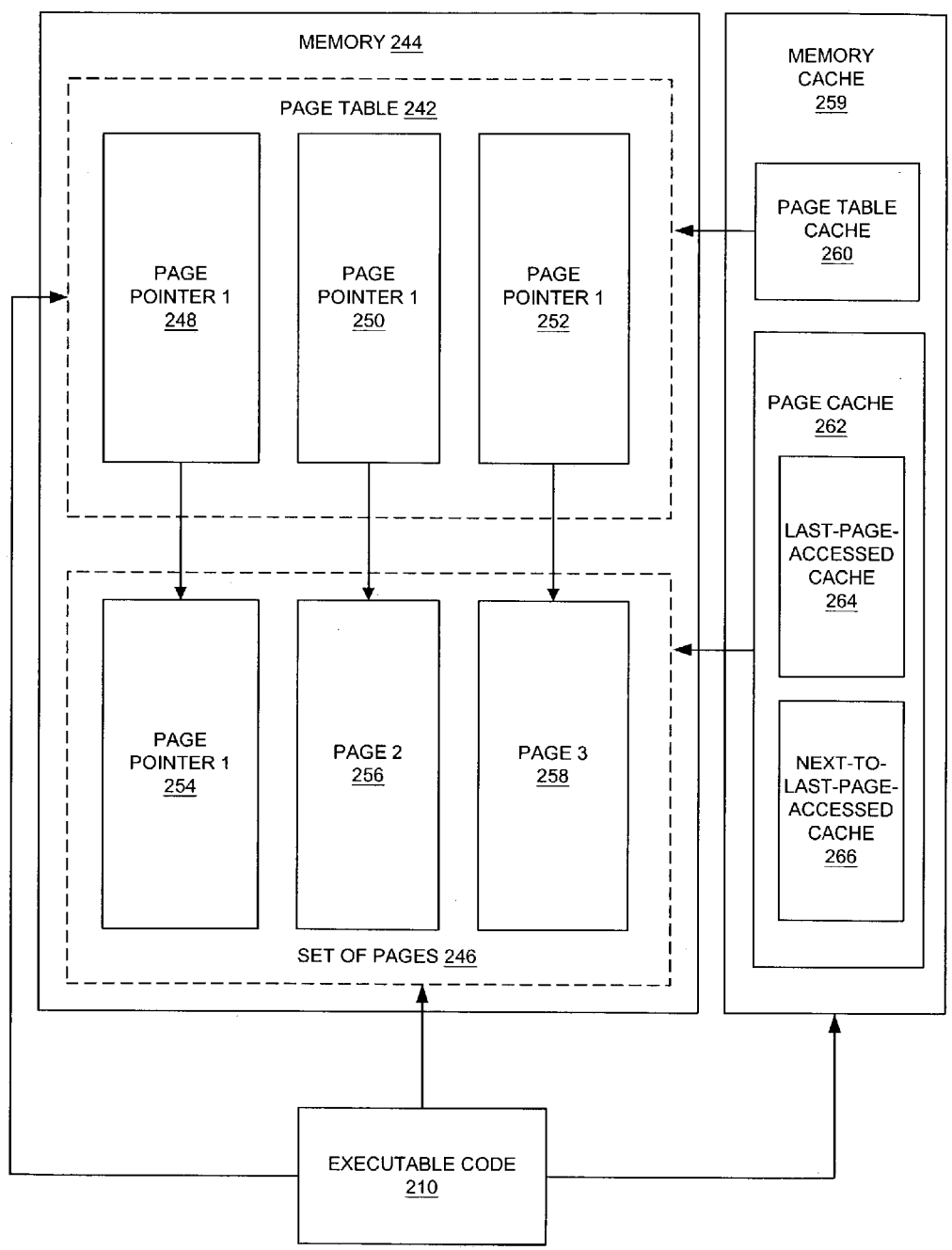
FIG. 5 shows a page table and associated components in accordance with an embodiment of the invention.

In addition, the code generator process (208) may generate executable code (210) for execution on the computer system that is enabled to access a page table and associated components, as shown in FIG. 5. The executable code (210) may be a software application, such as a cycle-based simulation program to execute on the computer system. The executable code (210) uses the functionality of an operating system (e.g., Solaris™) to access a page table (242). In accordance with an embodiment of the invention, the page table (242) is located in a memory (244) of a computer system.

The page table (242) includes one or more page pointers to one or more pages of a set of pages (246) in the memory (244). In accordance with an embodiment of the invention, pages of the set of pages (246) represent a contiguous section of the memory (244). Those skilled in the art will appreciate that although FIG. 5 shows three pages and three pointers to pages, more than three pages and more than three page pointers to pages may be used in another embodiment of the system. For example, page pointer 1 (248), page pointer 2 (250), and page pointer 3 (252) point to page 1 (254), page 2 (256), and page 3 (258), respectively.

In accordance with an embodiment of the invention, a page pointer points to a middle of a page of the set of pages (246). Specifically, page pointer 1 (248), page pointer 2 (250), and page pointer 3 (252) point to a middle of page 1

(254), page 2 (256), and page 3 (258), respectively. For example, if page 1 (254) has a size of 8192 bytes, then page pointer 1 (248) points to an address 4096 bytes from a starting address of page 1 (254).

A memory cache (259) includes a page table cache (260) and a page table (262). The page table cache (260). contains a page table starting address (of the page table (242)). In accordance with an embodiment of the invention, the page table cache (260) is a register accessible to a processor executing the executable code.

The page cache (262) is a set of registers enabling the executable code to take advantage of temporal locality with respect to patterns of accessing pages of the set of pages (246). The page cache (262) contains an address of the last page accessed by the executable code, which is stored in a last-accessed-page cache (264). The page cache (262) also contains an address of the next-to-last accessed page of the set of pages (246), which is stored in the next-to-last-accessed page cache (266). For example, if the native executable code accesses page 1 (254) and then accesses page 2 (256), the last-accessed-page cache (264) includes the address of page 2 (256) and the next-to-last-accessed page cache (266) includes the address of page 1 (254).

Figure 6:
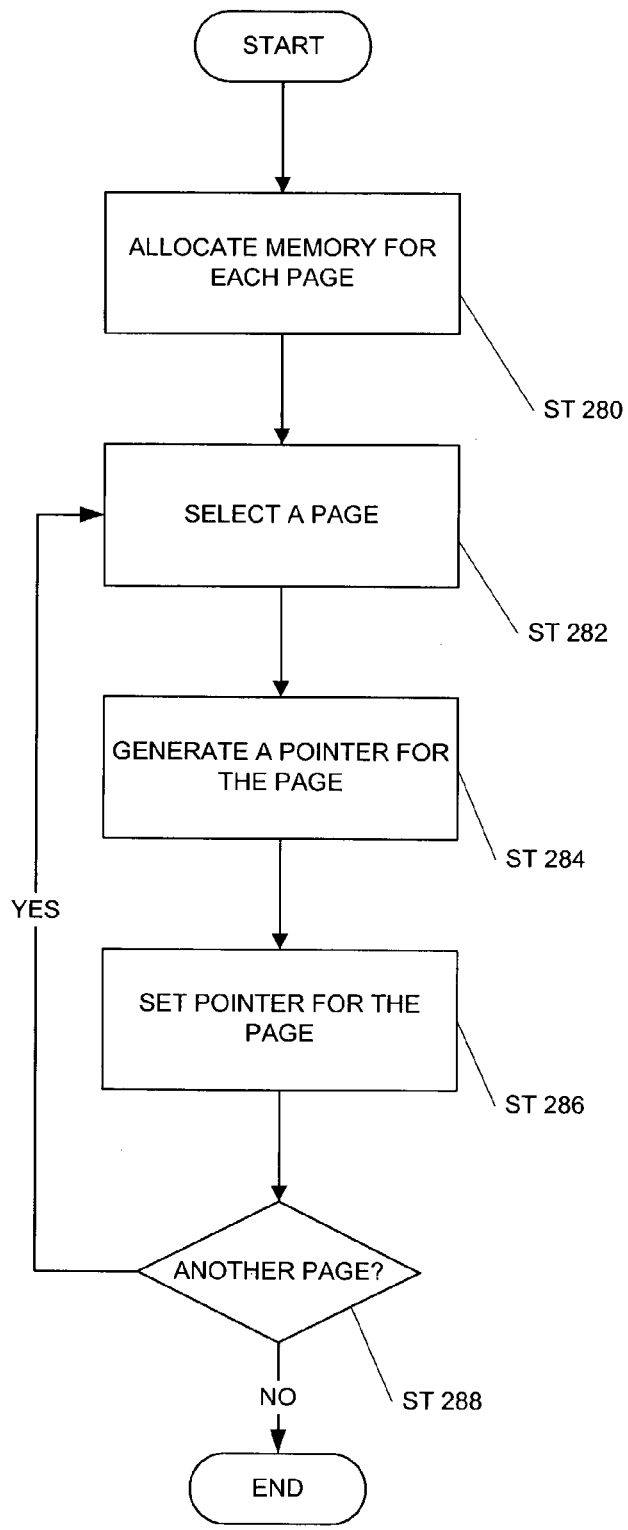
FIG. 6 shows a flow chart for generating the page table and associated components in accordance with an embodiment of the invention.

FIG. 6 shows a flow chart for generating the page table and associated components. In accordance with an embodiment of the invention, generating the page table and associated components may be accomplished using the compiler discussed in FIG. 4, executing on the computer system shown in FIG. 3.

A first step includes allocating memory for each page (Step 280). In accordance with an embodiment of the invention, allocating memory for the each page includes determining a starting point in the memory for each page, and allocating memory from the starting point of the current page to an ending point of the selected page. In accordance with an embodiment of the invention, 8192 bytes of memory are allocated for the current page.

Next, a page is selected (Step 282), and a pointer for the page is generated (Step 284). A size of the pointer may be determined by available memory and/or the architecture of the computer system. In accordance with an embodiment of the invention, the pointer is 4 bytes in size. Once the pointer has been generated, the pointer is set to the middle of the page (Step 286). For example, if the page has a size of 8192 bytes, the pointer may be set to an address of 4096 bytes after a starting address of the page. Once the pointer for the page has been generated and set, a determination is made whether another page of the set of pages requires pointer generation and setting (Step 288). If no other page requires pointer generation and setting, the process terminates. Otherwise, another page is selected (Step 282) and Steps 284–288 are performed.

Figure 7:
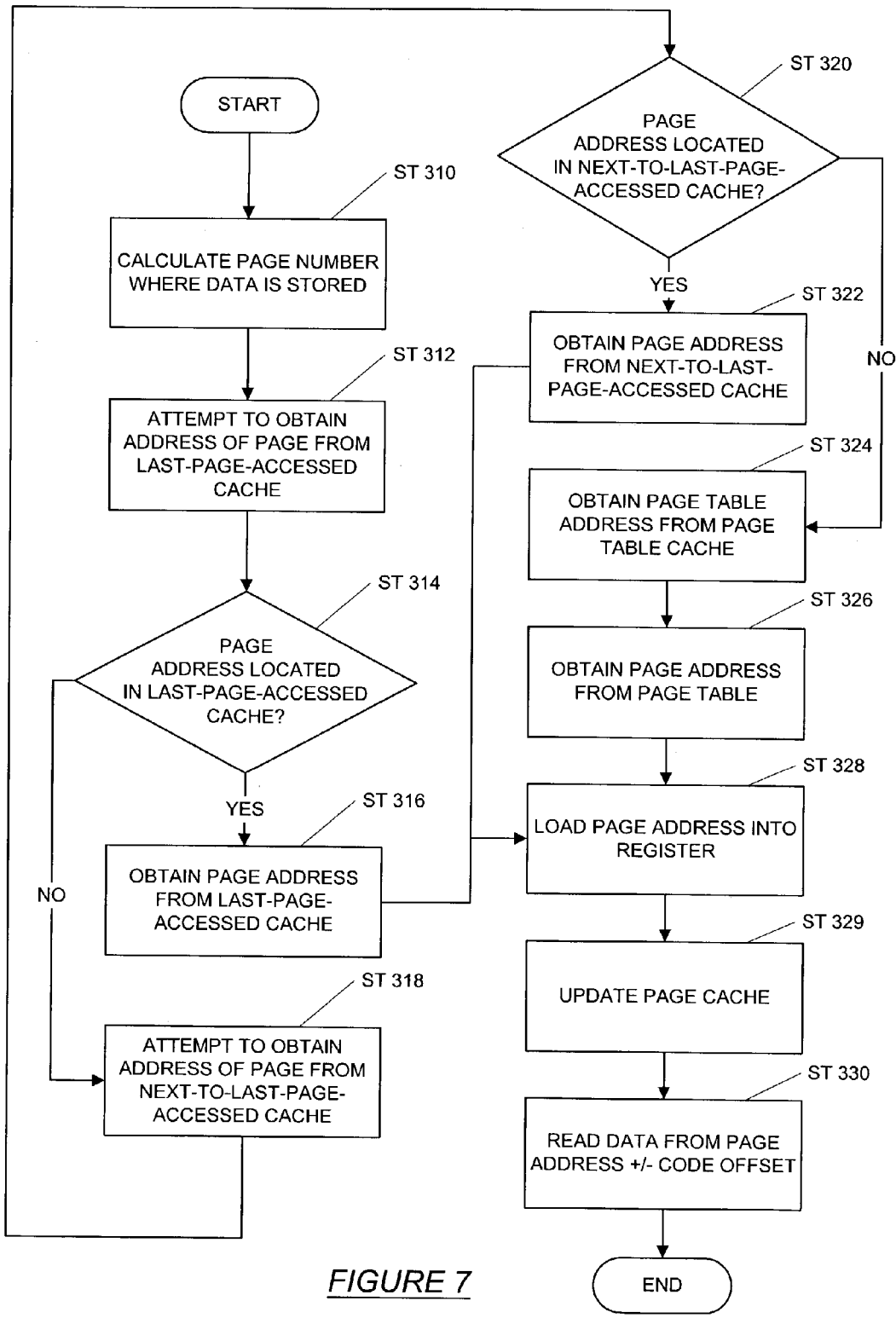
FIG. 7 shows a flow chart for use of the page table and associated components in accordance with an embodiment of the invention.

FIG. 7 shows a flow chart for use of the page table and associated components by the statically-generated executable code. For example, the executable code may require data, e.g., a value of a particular simulation variable, at a particular time during execution of a simulation.

A first step includes calculating a page number where the data is stored (Step 310). The data, in accordance with an embodiment of the invention, may be associated with a relative address, e.g., 10000H (in hex notation). The particular page number in which the data is stored may be calculated by dividing 10000H by the page size. For example, if the page size is equal to 8196 bytes, then 10000H divided by 8196, gives a result equal to "8." Thus, the data is stored on page number 8.

Once the page number of the page has been calculated, an attempt is made to obtain the address of the page from the last-page-accessed cache (Step 312). A determination is then made whether the address of the page is located in the last-page-accessed cache (Step 314). If the address of the page is located in the last-page-accessed cache, the page address is obtained from the last-page-accessed cache (Step 316).

If the address of the page is not located in the last-page-accessed cache, then an attempt is made to obtain the address of the page from the next-to-last-page-accessed cache (Step 318). A determination is then is made weather the address of the page is located in the next-to-last-page-accessed cache (Step 320). If the address of the page is located in the next-to-last-page-accessed cache, then the address of the page is obtained from the next-to-last-page-accessed cache (Step 322). If the address of the page is not located in the next-to-last-page-accessed cache, then the page table address is obtained from the page table cache (Step 324), and the address of the page is obtained from the page table (Step 326).

Once the address of the page is obtained (from either the last-page-accessed cache, the next-to-last-page-accessed cache, or the page table), the address of the page is loaded into a register (Step 328), and the page cache is updated with the address of the last-accessed page and the address of the next-to-last-accessed page (Step 329). Then, the data, e.g., the simulation variable, is read from the page in the memory (Step 330).

In accordance with an embodiment of the invention, the data is read from an address equal to the middle of the page, plus or minus a code offset. The code offset may be included as part of the particular instruction of the executable code that is used to read the data from the page. For example, the code offset may be equal to "–100" bytes. Thus, when the data is read from the page, the data is read from a starting data address of 4096–100 bytes from the starting address of the page.

In accordance with an embodiment of the invention, the executable code may be written using standard software programming techniques to enhance performance. For example, the executable code may be written so that functions are inline (instead of making a function call). Thus, inline code is generated by the compiler. Also, the compiler may be configured to automatically inline functions when performance enhancements may be attained.

Advantages of various embodiments of the present invention may include one or more of the following. In one or more embodiments, the relocation of data and/or code instructions in pages is avoided by pre-calculation of page addresses. Thus, when the loader loads the executable code into memory, relocation of the executable code is avoided, and a copy on write of data stored in pages is avoided. Therefore, the opportunity arises to have two separate processes sharing the same data in a page, which is stored in a single external cache line. Thus, performance of the software application is enhanced by efficient use of the external cache and physical memory. Furthermore, by using inline functions, large basic blocks of the software application are created. Thus, the executable code executes with fewer branching, thus providing performance enhancements.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for generating native code of a software application, comprising:
   a page table indexing a plurality of pages using a page pointer, wherein the page pointer comprises an address of at least one of the plurality of pages;
   a memory cache comprising a page table cache and a page cache, wherein the page cache comprises a last-accessed-page cache and a next-to-last-accessed-page cache; and
   a statically-generated executable code to obtain data on at least one of the plurality of pages using the memory cache.

2. The system of claim 1, further comprising:
   a compiler generating the statically-generated executable code.

3. The system of claim 1, wherein the page table cache comprises an address of the page table.

4. The system of claim 3, wherein the page table cache is a register.

5. The system of claim 1, wherein the last-accessed-page cache and the next-to-last-accessed-page cache are registers.

6. The system of claim 1, wherein the page table and the plurality of pages are located in a memory.

7. The system of claim 1, wherein the address of at least one of the plurality of pages is obtained from the page cache.

8. A method for generating native code of a software application, comprising:
   calculating an address of a page;
   setting a pointer to the address of the page, wherein setting the pointer comprises reading the pointer from a last-page-accessed cache or from a next-to-last-page-accessed cache;
   generating an instruction for the software application to obtain the address of the page using the pointer; and
   executing the instruction to obtain data from the page at the obtained address.

9. The method of claim 8, further comprising:
   generating the instruction using a compiler.

10. The method of claim 8, wherein setting the pointer comprises:
    calculating a page number of the page;
    obtaining an address of a page table; and
    reading the address from the page table using the page number.

11. The method of claim 8, further comprising:
    updating the last-page-accessed cache.

12. The method of claim 8, further comprising:
    updating the next-to-last-page-accessed cache.

13. The method of claim 8, wherein executing the instruction comprises:
    loading the address of the page into a register; and
    reading the data using the address in the register.

14. A computer system for enhancing performance of a software application, comprising:
    a processor;
    a memory;
    a storage device; and
    software instructions stored in the memory for enabling the computer system to perform:
      calculating an address of a page in the memory;
      setting a pointer to the address of the page, wherein setting the pointer comprises reading the pointer from a last-page-accessed cache or from a next-to-last-page-accessed cache;
      generating an instruction for the software application to obtain the address of the page using the pointer; and
      executing the instruction to obtain data from the page at the obtained address.

15. The computer system of claim 14, further comprising software instruction to perform:
    generating the instruction using a compiler.

16. The computer system of claim 14, wherein setting the pointer comprises:
    calculating a page number of the page;
    obtaining an address of a page table; and
    reading the address from the page table using the page number.

17. The computer system of claim 14, further comprising:
    updating the last-page-accessed cache.

18. The computer system of claim 14, further comprising:
    updating the next-to-last-page-accessed cache.

19. The computer system of claim 14, wherein executing the instruction comprises:
    loading the address of the page into a register; and
    reading the data using the address in the register.

20. An apparatus for enhancing performance of a software application, comprising:
    means for calculating an address of a page;
    means for setting a pointer to the address of the page, wherein setting the pointer comprises reading the pointer from a last-page-accessed cache or from a next-to-last-page-accessed cache;
    means for generating an instruction for the software application to obtain the address of the page using the pointer; and
    means for executing the instruction to obtain data from the page at the obtained address.

* * * * *